INVENTORS
GEORGE K. FARNEY
JOSEPH FEINSTEIN
BY Larry E. Aine
ATTORNEY

INVENTORS
GEORGE K. FARNEY
JOSEPH FEINSTEIN
BY Harry E. Aine
ATTORNEY

United States Patent Office 3,387,170

Patented June 4, 1968

3,387,170

STUB SUPPORTED STRIPLINE HELICAL SLOW WAVE CIRCUIT FOR ELECTRON TUBE

George K. Farney, New Providence, N.J., and Joseph Feinstein, Menlo Park, Calif., assignors to S-F-D Laboratories, Inc., Union, N.J., a corporation of New Jersey Filed May 7, 1965, Ser. No. 454,140

9 Claims. (Cl. 315—3.5)

ABSTRACT OF THE DISCLOSURE

Stub supported helical slow wave circuits are disclosed together with tubes using same. The helix circuit comprises a helical stripline conductor having a width greater than the spacing between adjacent turns of the helical stripline conductor to provide a helix circuit having a relatively low characteristic impedance. The stub supports for the helix are aligned one behind the other along the line of circuit development and the stub members are dimensioned relative to the dimensions of the helical stripline for presenting a characteristic circuit impedance to the helix circuit portion which is greater than one-half the characteristic impedance of the helix portion of the composite circuit, whereby wideband operation of the circuit and tube using same is obtained. A number of different helix derived slow wave circuits are disclosed including a helix coupled, ladder line, bifilar helix, and vane array. In one embodiment, a pair of bifilar wound helices couple separate stub arrays and insulator means are provided for applying different electrical potentials to each one of the bifilar wound helices for electrostatic focusing of the beam.

Heretofore stub supported helix or topological equivalent helix type slow wave circuits have been used in microwave amplifier tubes. However, in such prior art tubes the stub supports have been used for cooling of the circuit and therefore have been formed of relatively large thickness metallic members which are characterized by an attendant reduction in characteristic electric impedance. Also the supported helical circuit or topologically equivalent helical circuit has heretofore been formed of members having relatively small thickness compared to the thickness of the stub supports in order to increase the electronic interaction impedance of the helical circuit.

It has been discovered that when the thickness of the stub supports is substantially greater than the thickness of the helical conductor of the slow wave circuit that the bandwidth of the helical circuit is thereby drastically reduced.

In the present invention, the bandwidth of tubes employing a stub supported helix circuit or stub supported topologically equivalent helix circuit is substantially increased by forming the stub supports with a characteristic impedance comparable to or greater than the characteristic impedance of the helix or topologically equivalent helix circuit. In addition, the present invention contemplates forming the helix with a lower characteristic impedance than the stub supports and interacting a stream of electrons or beam with the higher impedance stub support portion of the circuit, whereby broadband operation is achieved with higher gain and thus smaller tube size and weight.

The principal object of the present invention is the provision of an improved slow wave circuit and improved tubes employing same.

One feature of the present invention is the provision of an improved slow wave circuit comprising a stub supported helix or topologically equivalent helix circuit wherein the characteristic impedance of the stubs is comparable to or higher than the characteristic impedance of the helix or topological equivalent slow wave circuit, whereby the bandwidth of the circuit is enhanced.

Another feature of the present invention is the same as the preceding feature wherein electronic interaction is obtained between a stream of electrons and the fields of the relatively high impedance stub support portion of the circuit, whereby increased gain is obtained per unit length of the broadband circuit.

Another feature of the present invention is the same as the preceding feature wherein the stub support circiut is a helix coupled vane circuit.

Another feature of the present invention is the same as the second feature wherein the helix coupled stub support circuit is a ladder line.

Figures 1, 1A, 1B, 2, 3, 4, 5, 6, 7, 8, 9, 10:
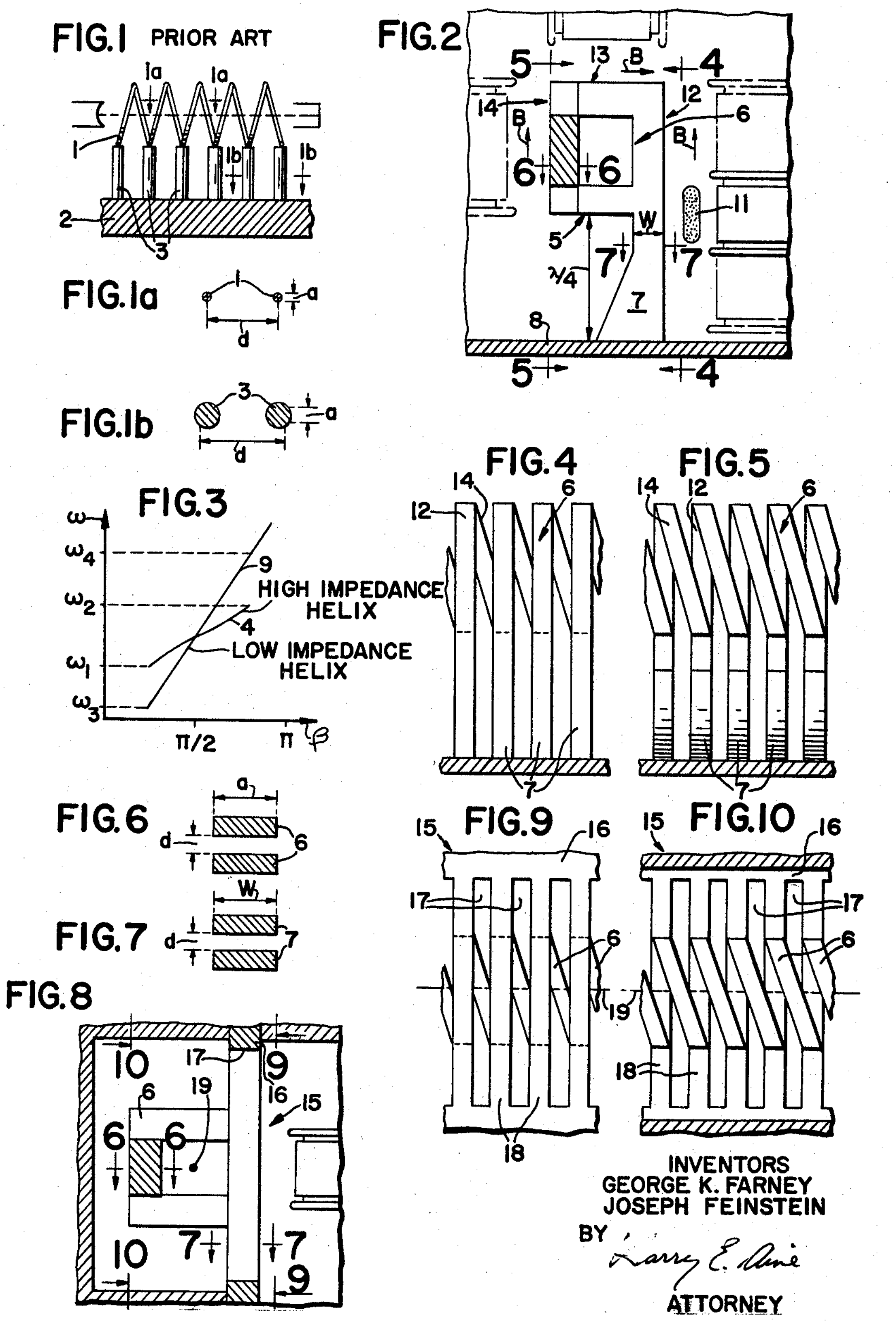
Figure 11:
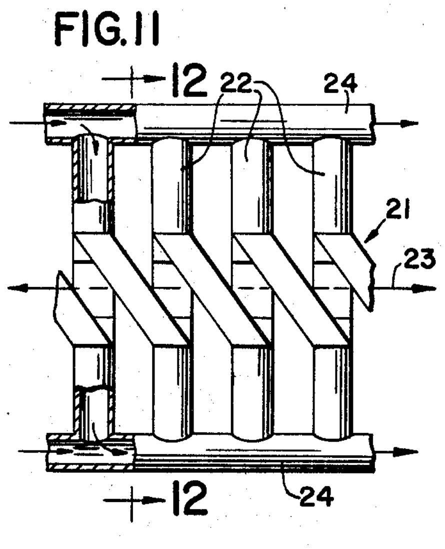

These and other features and advantages of the present invention will become more apparent upon a perusal of the following specification taken in conjunction with the accompanying drawing wherein:

FIG. 1 is a perspective side view partly in section of a typical prior art stub supported helix circuit, FIG. 1*a* is a transverse sectional view of a fragment of the helix of FIG. 1 taken along line *a—a* in the direction of the arrows, FIG. 1*b* is a transverse sectional view of the stub supports of FIG. 1 taken along line *b—b* in the direction of the arrows, FIG. 2 is a fragmentary transverse sectional view of a novel helix coupled circuit of the present invention, FIG. 3 is an $\omega$ vs. $\beta$ diagram showing the dispersion characteristics for the prior art helix circuit and for the circuit of the present invention, FIG. 4 is a longitudinal view of the structure of FIG. 2 taken along line 4—4 in the direction of the arrows, FIG. 5 is a longitudinal view of the structure of FIG. 4 taken along line 5—5 in the direction of the arrows, FIGS. 6 and 7 are enlarged sectional views of portions of the structures of FIGS. 2 and 8 taken along line 6—6 and 7—7, respectively, in the direction of the arrows, FIG. 8 is a transverse sectional view of an alternative helix coupled slow wave circuit of the present invention, FIG. 9 is a longitudinal view of the structure of FIG. 8 taken along line 9—9 in the direction of the arrows, FIG. 10 is a longitudinal view of the structure of FIG. 8 taken along line 10—10 in the direction of the arrows, FIG. 11 is a fragmentary longitudinal view partly broken away of a novel slow wave circuit of the present invention.

Figure 16:
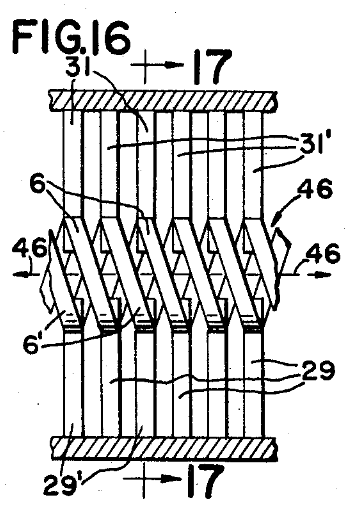
Figure 17:
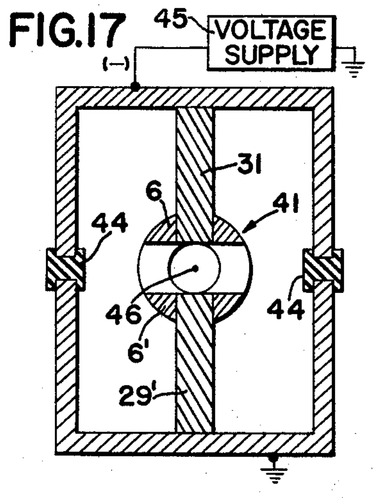
Figure 15:
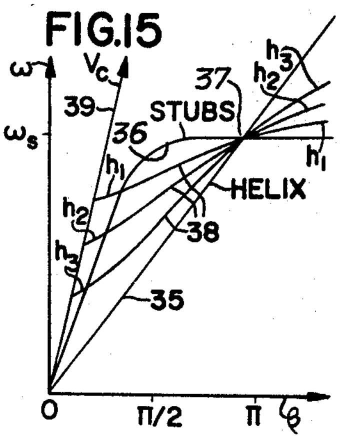
Figure 13:
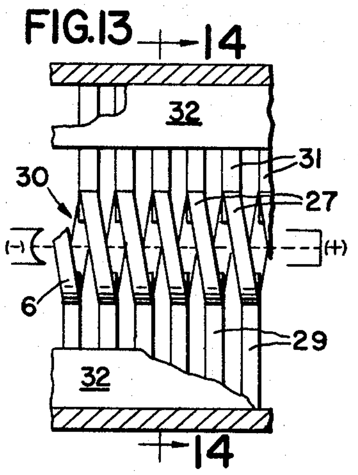
Figure 14:
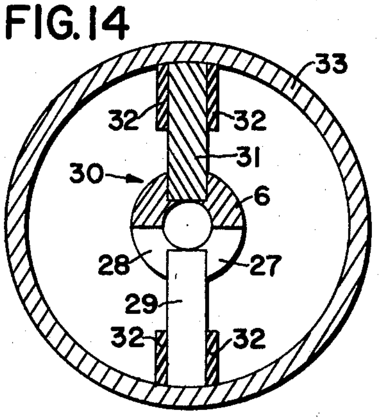
Figure 12:
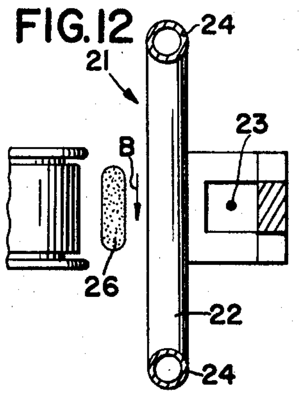

FIG. 12 is a sectional view of the structure of FIG. 11 taken along line 12—12 in the direction of the arrows, FIG. 13 is a fragmentary longitudinal sectional view partly broken away of a stub supported helix circuit of the present invention, FIG. 14 is a transverse sectional view of the structure of FIG. 13 taken along line 14—14 in the direction of the arrows, FIG. 15 is an $\omega$ vs. $\beta$ diagram for the helix of FIGS. 11 and 12 showing the dispersion curves for the helix and stub support circuits, FIG. 16 is a longitudinal sectional view of a novel stub supported slow wave circuit of the present invention, and FIG. 17 is a transverse sectional view of the structure of FIG. 16 taken along line 17—17 in the direction of the arrows and slightly modified to show an alternative electrostatic focusing means.

Referring now to FIG. 1 there is shown the typical prior art stub supported helix slow wave circuit wherein a helix 1 is supported at each turn from a heat sink 2 via the intermediary of quarter wave length stubs 3. The stubs are typically of rather large transverse dimension *a*, compared to the helix wire to provide good thermal conductance to the heat sink. Also, the helix wire has been preferably made as small in cross section as possible in order to have as high an electronic interaction impedance as possible commensurate with the thermal capacity requirements of the helix circuit.

Given these relationships of wire spacing *d*, and transverse dimensions *a*, as shown in FIGS. 1*a* and 1*b* the characteristic impedances $Z_0$, for the helix transmission line and the stub support circuits are computed as though adjacent turns of the helix were two wires of the two wire line and adjacent stub members were adjacent wires of a two wire line. For a strip line helix or stub circuit the characteristic impedance is: $Z_0=377d/a\Omega$. Thus in the typical prior stub supported helix slow wave circuit the helix is seen to have a higher characteristic impedance than the stub support circuit. Under such conditions of relative characteristic impedances the band width $\omega_1$ to $\omega_2$ of the helix circuit 1 is greatly reduced, compared to a free helix, yielding a dispersion characteristic as indicated by curve 4 of FIG. 3.

Referring now to FIGS. 2–7 there is shown a stub supported helix slow wave circuit 5 of the present invention. In this circuit 5 a helix 6 is formed of a helically wound strip line having relatively low characteristic impedance $Z_0$, as of for example, 75 ohms. The helix 6 is very conveniently formed, in the manner as described in copending application Ser. No. 406,305, filed Oct. 26, 1964, now issued as U.S. Patent No. 3,376,463 on Apr. 2, 1968 and assigned to the same assignee as the present invention, by slotting a hollow rectangular thick walled tube with an array of closely spaced transverse slots passing through three sides of the tube and interconnecting adjacent slots by an array of diagonal slots passing through the remaining side.

An array of vane like stub members 7 are affixed to the helix 6 at adjacent turns thereof for supporting the helix 6, form a suitable heat sink 8 as for example a conducting wall member. The vane support members are dimensioned to be approximately a quarter wavelength long centered at the operating range of the tube in order to present a high impedance to the helix 6. In addition, the characteristic impedance $Z_0$ of the strip transmission line formed between adjacent stub members is selected to be comparable to within 50% of or higher than the characteristic impedance of the strip line helix 6. More particularly, the widths *a* of the mutually opposed conductor portions of the helix 6 (see FIGS. 6 and 7) are made at least 50% of the width *w* of the stub members when the stubs 7 have the same spacing *d* as the adjacent turns of the helix 6. Incidentally, when a tapered stub 7 is used the characteristic impedance $Z_0$ is that obtained for width *w* which is approximately the median dimension of the stub as measured within a quarter wavelength from the connection of the stub 7 to the helix 6.

When the characteristic impedance of the stub support structure is comparable to or higher than the characteristic impedance of the helix 6 the dispersion curve for the stub supported helix circuit takes the form of curve 9 of FIG. 3. This dispersion curve 9 shows that the bandwidth, $\omega_3$ to $\omega_4$, has been substantially increased as compared to the bandwidth $\omega_1$ to $\omega_2$ of the conventional stub supported helix circuit 1.

The increased bandwidth for the low impedance stub supported helix 6 is obtained in trade for a lower electronic interaction impedance. However, this lower electronic interaction impedance is sufficient for many tube applications and permits construction of broadband high power amplifiers by interacting the R.F. fields of the helix 6 or stubs 7 or both with an electron stream 11 which may be provided by conventional linear or circular tube geometries with either of the conventional type O or type M beam optics.

Furthermore, the electron stream 11 may be interacted with the R.F. fields of any one of the various faces 12, 13 or 14 of the helix circuit 6 or with the R.F. fields inside the helix 6.

Also, the bandwidth of the helix circuit 6 may be increased still further by further increasing the characteristic impedance of the stub supports. This is conveniently accomplished by removing alternate stubs 7 or, in other words, stub supporting the helix 6 at every other turn. This doubles the spacing *d* between adjacent stub members 7 thereby increasing their characteristic impedance but reduces the thermal capacity of the circuit.

Referring now to FIGS. 8–10 there is shown an alternative helix circuit of the present invention. This circuit is characterized as a helix coupled ladder line or slot circuit 15 and has a foundamental forward wave dispersion characteristic 9 the same as for the stub supported circuit 5 of FIGS. 2, 4 and 5. Briefly, the circuit 15 comprises a conductive wall member 16 as of copper provided with an array of transverse slot 17 therethrough to define an array of conductive bars 18 between slots 17. A helix 6 of low characteristic impedance is fixedly attached to the bars 18 intermediate their lengths. The central portion of the bars 18 preferably form one side of the helix 6. The helix 6 is directed along the line of circuit development 19, the mean direction of R.F. power flow on the circuit 15. The bars 18 may be hollow to permit cooling by flowing a coolant therethrough. As in the previous examples of the present invention, the bars 18 have a width *w* comparable to or less than the width *a* of the strip line helix 6 in order that the impedance $Z_0$ of the bar supports 18 should be comparable to or higher than the impedance $Z_0$ of the helix 6. In this manner broadband operation is achieved, as indicated by the dispersion curve 9 of FIG. 3, for a high thermal capacity circuit. A stream of electrons 11 may be interacted with the fields of the helix 6 or bar supports 18 in the ways as previously described for the helix circuit of FIGS. 2, 4 and 5.

Referring now to FIGS. 11 and 12 there is shown a ladder line bar circuit 21 equivalent to the slot ladder line circuit 15. In this case the ladder line is formed of tubes 22 transversely directed to the line of circuit development 23 and interconnecting a pair of longitudinally directed conductive tubes 24. The tubes 22 and 24 are all in fluid communication with each other, the longitudinal tubes serving as input and output fluid coolant manifolds with the transverse tubes 22 being connected in parallel for fluid flow. Although the electron stream 11 may electronically interact with the R.F. fields of the circuit 21 in any one or more of the ways previously described, a preferred embodiment interacts the fields between the conductive tubes 22 with an electron stream 26 flowing parallel to the direction of circuit development 23.

Referring now to FIGS. 13 and 14 there is shown an alternative circuit embodiment 30 of the present invention. In this embodiment the helix circuit 6 is formed by a pair of relatively thick walled elongated semicylindrical members 27 and 28, respectively, fixedly secured as by brazing on opposite sides of and bridging across the mutually and diametrically opposed free ends of a pair of vane arrays 29 and 31. The semicylindrical members 27 and 28 are diagonally slotted on opposite sides of the vanes 29 and 31 with the pitch of the slots being equal and forward on one side and backward on the other, and of sufficient amount to cause the pitch of the resultant helix 6, formed thereby, to advance from one vane 29 or stub support to the next stub 31 in one half of a turn of the helix 6. The helix 6, as in the previous embodiments of the present invention, is dimensioned to have a characteristic impedance $Z_0$ which is comparable to or less than the characteristic impedance $Z_0$ of the stub supports 29 and 31, respectively, whereby relatively wide band operation is achieved for a relatively high thermal capacity circuit 30. While this circuit 30 may be used for crossed field tube geometries, preferably by making the helix of rectangular transverse configuration such as shown in FIGS. 2, 4, 5 and 8–12 and interacting the electron stream with either the stub support structure or the helix, it is preferred to use the circuit structure 30 of FIGS. 13 and 14 with a linear O type beam wherein the beam is projected in a linear path through the center of the helix circuit 6. Such a preferred tube configuration is especially useful for wide band high average power amplifiers.

Slabs 32 of lossy dielectric material such as carbon impregnated alumina ceramic are preferably placed adjacent the stub support members 29 and 31 near the center or slightly upstream end of the helix 6 for attenuation of undesired waves traveling on the composite circuit 30. A suitable heat singing vacuum envelope 33 as of copper encloses the circuit 30.

Referring now to FIG. 15 there is shown an $\omega$ vs. $\beta$ diagram for the circuitry 30 of FIGS. 13 and 14. A freely supported helix, i.e., no electrically conductive support members, has a typical dispersion curve illustrated by curve 35. An array of stub supports, taken alone, has a typical dispersion curve 36 characterized by an upper cut off frequency $\omega_S$. These circuits are matched at point 37 when the stubs have nearly an electrical quarter wavelength from the envelope 33 to their free ends. However, as one departs from the frequency of operation $\omega_S$ wherein the stubs are a quarter wavelength long the composite circuit 30 has a dispersion characteristic dependent upon the ratio of characteristic impedances of the stub support members 29 and 31 to the characteristic impedance of the helix 6. More particularly, as this ratio $h$ increases the more nearly the dispersion characteristic 38 of the composite cricuit 30 approaches the dispersion characteristic of the freely suspended helix 35. These circuit dispersion characteristic curves $h_1$, $h_2$, and $h_3$ are shown in FIG. 15 where $h_3$ is the highest ratio of stub characteristic impedance to helix characteristic impedance. The curve 39, marked $V_c$, corresponds to the dispersion characteristic of an unloaded strip line with a fundamental wave phase velocity equal to the velocity of light $V_c$.

Referring now to FIGS. 16 and 17 there is shown an alternative helix circuit embodiment 41 of the present invention. In this slow wave circuit 41 the slow wave circuit comprises a pair of bifilar helices 6. Each helix 6 is supported in the manner as previously described with regard to FIGS. 13 and 14. More specifically, a first helix 6 is supported upon a pair of diametrically opposed vane arrays 29 and 31, as in FIGS. 13 and 14. A second helix 6', interleaved in bifilar relationship with the first helix 6, is supported upon a second pair of diametrically opposed vane arrays 29' and 31', respectively, as previously described in FIGS. 13 and 14. In such a circuit 41, each helix 6 and 6' is supported via stubs or vanes on opposite sides of the helix with a support stub for each half turn of the helix.

Electrostatic beam focusing may be applied to bifilar circuit 41 by deleting every other one of the stub supports from each stud array in such a manner as to support each helix 6 and 6' from only one side, one helix 6 being supported from one stub array 29 and the other helix 6' being supported via the other stub array 31'.

Insulator assemblies 44 in the surrounding envelope 33 insulate stub array 29 from the other stub array 31' to allow the D.C. beam focus potentials to be applied across the helices 6 and 6' from a suitable supply 45. A beam projected along the line of circuit development 46 produces cumulative interaction with the beam in the conventional bifilar helix mode.

Since many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. In an electron tube apparatus, means for producing a stream of electrons; means forming a composite radio frequency wave supporting circuit for cumulative interaction with the electron stream; said composite circuit including, a helix circuit portion means with its line of circuit development directed substantially in the same direction as the stream of electrons, means forming an array of radio frequency conductive stub members aligned one behind the other along the line of circuit development and connected to said helix portion along the length of said helix portion and defining a stub circuit portion; the improvement comprising, said helix circuit portion having a helical stripline conductor configuration with the width $a$ of said stripline conductor being greater than the spacing $d$ between adjacent turns of said helical stripline conductor, and said stub circuit portion means being dimensioned relative to the dimensions of said helical stripline for presenting a characteristic circuit impedance to said helix circuit portion which is greater than one-half the characteristic impedance of said helix portion of said composite circuit, whereby wideband operation of the tube is obtained.

2. The apparatus according to claim 1 wherein said electron stream is disposed immediately adjacent said stub array portion for electronic interaction with the electric R.F. fields of said stub array portion whereby enhanced electronic interaction is obtained.

3. The apparatus according to claim 1 including means forming a heat sink wall member and wherein said stub circuit portion physically interconnects said helix circuit portion to said heat sinking wall member means to enhance cooling of said composite circuit means.

4. The apparatus according to claim 1 wherein said composite circuit means is a helix coupled ladder line.

5. The apparatus according to claim 4 wherein said stub array is formed by the members remaining between adjacent parallel slots passing through a conductive wall member.

6. The apparatus according to claim 4 wherein said stubs comprise an array of parallel bars with the bars transversely directed to the line of circuit development.

7. The apparatus according to claim 6 wherein said bars are hollow for passage of a coolant fluid therethrough.

8. The apparatus according to claim 1 wherein said helix circuit portion comprises a pair of bifilar wound helices.

9. The apparatus according to claim 8 wherein the electron stream passes coaxially of the helix circuit and including, means for applying different D.C. electric potentials to each of said bifilar wound helices for electrostatic focusing of the electron stream.

References Cited

UNITED STATES PATENTS

| | | | |
|---|---|---|---|
| 2,853,642 | 9/1958 | Birdsall et al. | 315—3.5 |
| 2,939,035 | 5/1960 | Reverdin | 315—3.5 |
| 2,971,114 | 2/1961 | Dow | 315—3.6 |

FOREIGN PATENTS

| | | |
|---|---|---|
| 958,923 | 5/1964 | Great Britain. |

HERMAN KARL SAALBACH, *Primary Examiner.*

PAUL L. GENSLER, *Assistant Examiner.*